United States Patent [19]

Cook

[11] Patent Number: 5,067,858
[45] Date of Patent: Nov. 26, 1991

[54] MULTIPLE FACED CUTTER INSERT

[76] Inventor: Warren R. Cook, 5611 Dogwood Dr., Jackson, Mich. 49201

[21] Appl. No.: 682,980

[22] Filed: Apr. 10, 1991

[51] Int. Cl.⁵ .......................................... B23B 27/22
[52] U.S. Cl. ................................... 407/114; 407/116
[58] Field of Search ...................... 407/113, 114–116

[56] References Cited

U.S. PATENT DOCUMENTS

| | | | |
|---|---|---|---|
| 2,598,581 | 5/1952 | McKenna | 407/113 X |
| 3,097,417 | 10/1958 | Hill | 29/96 |
| 3,137,918 | 12/1960 | Breuning | 29/96 |
| 3,381,349 | 5/1968 | Newcomer | 29/96 |
| 3,395,434 | 8/1968 | Wirfelt | 29/95 |
| 3,399,442 | 9/1966 | Jones et al. | 29/95 |
| 3,781,956 | 1/1974 | Jones et al. | 29/95 |
| 3,786,541 | 1/1974 | Lundgren | 29/95 |
| 3,792,515 | 2/1974 | Lundgren | 29/95 |
| 3,815,191 | 6/1974 | Holma | 29/95 |
| 3,947,937 | 4/1976 | Hertel | 29/95 |
| 4,056,872 | 11/1977 | Seidel | 407/114 |
| 4,344,725 | 8/1982 | Seidel | 407/114 |

*Primary Examiner*—Steven C. Bishop
*Attorney, Agent, or Firm*—Beaman & Beaman

[57] ABSTRACT

A multiple faced cutter insert usable with lathes and turning machines, shapers, planers or milling cutters having a plurality of cutting edges associated with chip forming recesses. The adjacent cutting edges and lateral faces intersect at corners free of a radius and the chip forming recess associated with each cutting edge adjacent a corner produces chip flow at the corner substantially perpendicular to the associated cutting edge and recess. Preferably, the insert is of a regular pentagonal or hexagonal configuration to provide extensive support of each insert cutter corner to minimize corner breakage.

6 Claims, 1 Drawing Sheet

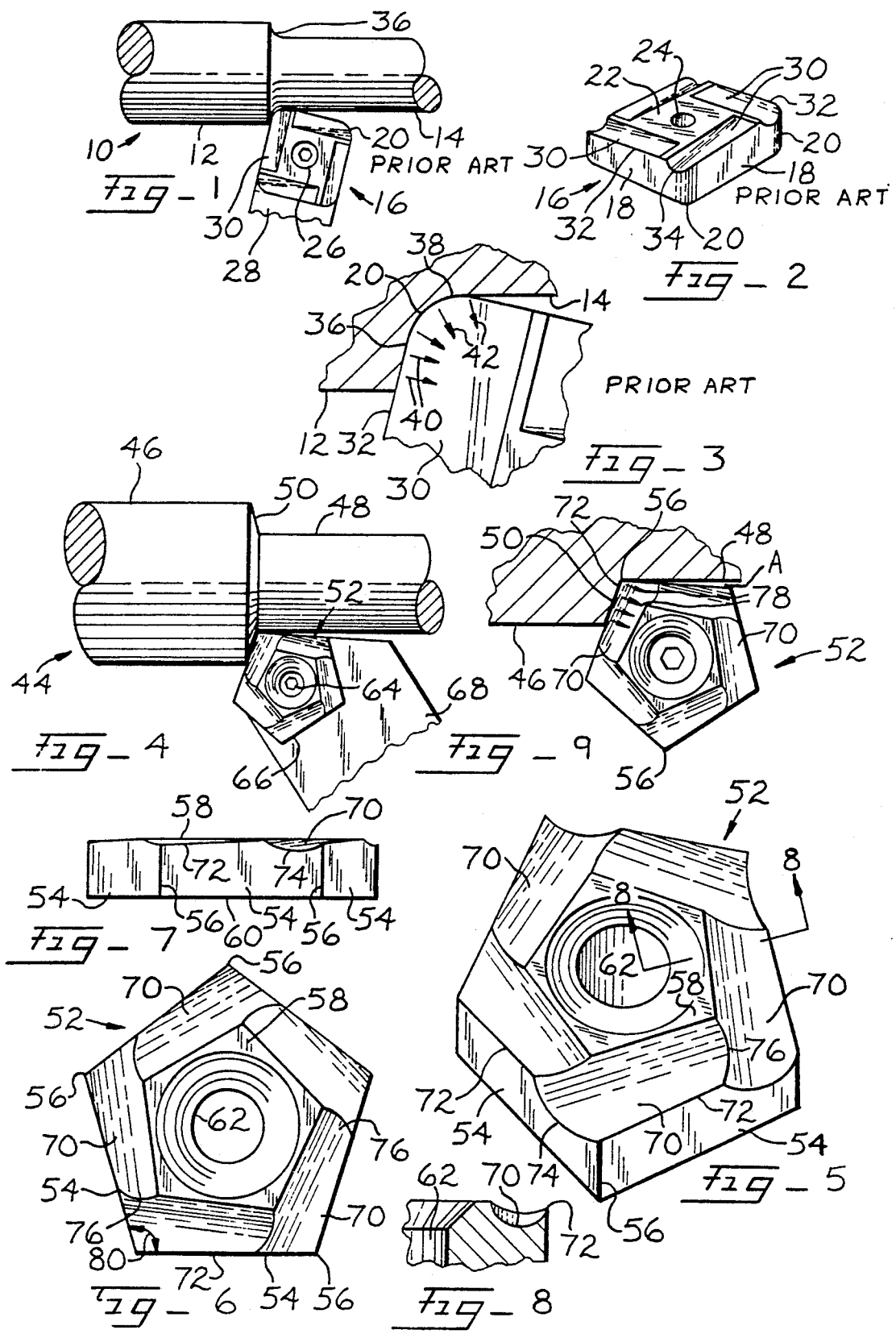

MULTIPLE FACED CUTTER INSERT

FIELD OF THE INVENTION

The invention pertains to cutter inserts of the type commonly used with turning machine tools, shapers, planers and milling machines. The cutter insert includes a plurality of faces which intersect with a top surface formed on the cutter insert having chip forming recesses intersecting a face to form a cutting edge.

BACKGROUND OF THE INVENTION

Cutter inserts commonly employ a plurality of lateral faces or sides and cutting edges whereby the cutting edges may be sequentially utilized as the tool wears. In common constructions such cutting inserts are often triangular in configuration having three lateral sides and cutting edges, or the cutting inserts may commonly be formed of a square configuration utilizing four similar cutting edges. Typical examples of cutter inserts of the above type are shown in U.S. Pat. Nos. 3,097,417; 3,137,918; 3,395,434; 3,781,956; 3,786,541 and 3,815,191.

As the length of the lateral sides of cutter inserts such as those disclosed in the above patents are equal, inserts utilizing three sides define an apex of 60° as formed by intersecting lateral sides, while four sided cutter inserts have 90° corners as defined by intersecting lateral sides.

The corner edges of conventional cutter inserts often break during use in that the 60° and 90° included angles defined by the inserts intersecting lateral sides do not provide sufficient support of the material defining the cutting edge at the corner, and fracture often occurs at the corners of the insert requiring the replacement of the insert lateral side and cutting edge by rotating the insert upon its support.

Patents such as those identified above also utilize chip forming recesses adjacent the cutting edge. Such recesses are normally of an elongated concave configuration which cause the chip to be deflected upwardly after being removed from the workpiece. This deflection of the chip will tend to shape the chip, and cause a curl which aids in removing the chip from the cutting area. U.S. Pat. No. 3,815,191 is particularly directed to chip formation.

Because of the radius that occurs at the corners of conventional cutter inserts the configuration of the chip recess is such that the flow of the chip at the corner is not parallel with the chip flow at the linear portions of the cutting edge, and such non-parallel movement of the chip causes chip interference within the recess and may result in chip entanglement and "balling". Further, such non-parallel flow of the chip adjacent the insert corner substantially increases the power required to remove the chip and will result in insert "hot spots" which accelerate wear.

OBJECTS OF THE INVENTION

It is an object of the invention to provide a cutter insert for lathes, shapers, planers, milling machines and the like wherein the insert defines a plurality of cutting edges having intersections whereby the cutting edges of the intersections are strengthened so as to provide extended wear and resist breaking or fracture.

Another object of the invention is to provide a cutter insert having multiple lateral faces or sides and cutting edges wherein the lateral sides define corners and the corners and cutting edges are free of radii.

An additional object of the invention is to provide a multiple faced cutter insert having a plurality of cutting corners wherein the corners define angles greater than 90°, and preferably between 108° and 120° in order to provide the corners with increased strength and resistance to breakage and fracture.

Yet another object of the invention is to provide a multiple faced cutter insert employing chip forming recesses adjacent the insert cutting edges whereby the configuration of the recesses is consistent throughout the length of the cutting edge and parallel chip material flow occurs throughout the cutting edge including at the insert corner.

A further object of the invention is to provide a multiple faced cutter insert having chip forming recesses defined adjacent the cutting edges wherein the configuration of the recesses is uniform throughout the length and configuration of the recesses and minimal machinery power requirements are required while simultaneously improving the chip material flow as to ensure a smooth and uniform cutting action.

An additional object of the invention is to provide a multiple faced cutter insert having a cutting edge with a negative lead angle to strengthen the insert edge and protect the insert corners when making interrupted cuts such that the cutting edge during interrupted cuts will initially engage the cutting edge at a location spaced from the insert corner.

SUMMARY OF THE INVENTION

A cutting insert utilizing the concepts of the invention consists of a multiple faced hard body formed of suitable cutting material such as tool steel, carbide, or the like, as commonly used in machine tools for removing metal. The cutting insert consists of a plurality of lateral faces or sides, adjacent sides intersecting at corners, and the insert includes top and bottom surfaces substantially parallel to each other.

The lateral sides are equal in length as defined by the lateral side ends, and in accord with the inventive concepts five or six lateral sides are used such that the insert defines a regular pentagon or a regular hexagon. The intersection of lateral sides of the pentagon configuration define an included angle of 108°, while the intersecting lateral sides of a regular hexagon define an included angle of 120°.

The adjacent or intersecting lateral faces or sides intersect at corners which are free of a discernible radius, and it is an important aspect of the invention that the intersection of the lateral sides be free of the convex radius normally present with cutter inserts of this general type.

The top surface of the cutter insert body is provided with a chip forming and removing recess of an elongated configuration substantially parallel and adjacent each lateral side so as to intersect therewith and define a cutting edge. The recess is of a transverse concave cross section, and is of such a radius as to deflect the removed chip upwardly to form the desired chip configuration, and cause the chip to form and break as desired in order to minimize chip entanglement and facilitate chip removal from the cutting insert area.

The configuration of the chip breaking recess is such that the concave configuration of the recess is perpendicularly disposed to the cutting edge, even at the corners of the cutter insert. Accordingly, this arrangement insures that the chip flow into and across the recess even for material removed at the corner will be parallel to the chip material removed at other non-corner locations of the cutting edge, and such parallel chip material flow throughout the length of the cutting edge minimizes cutting power requirements and assures a more uniform and controllable chip material flow. Further, the configuration of the chip recess adjacent the insert corners eliminates "hot spots" and rubbing of the tool upon the workpiece such as would accelerate the wear of the insert cutting edge.

As the included angle defined by intersecting lateral sides is greater than 90° sufficient material is provided "behind" the cutting edge and lateral side engaging the workpiece to substantially strengthen the insert corner as compared with conventional cutter insert constructions wherein the included angle at the insert corner is 90° or less. This added material at the insert corner reduces the temperature at the cutter corner by helping to define a "heat sink" in addition to providing greater mass for mechanically supporting the corner, and cutter inserts constructed in accord with the invention have a greater life than conventional cutter insert configurations.

To simplify shaping of the cutter insert in accord with the invention the chip receiving recesses of intersecting lateral sides also intersect at the insert body top surface, and the transverse dimension of the chip recesses is such that an effective cutter edge is defined at each insert lateral side of a length at least one-half the length of the lateral side dimension. Preferably, the depth of the chip removing recess increases in the direction of the insert corner actively associated with the recess, and this increasing recess depth produces a cutting edge with the intersection of the associated insert lateral side which is obliquely related to the insert bottom surface.

The cutting edges are provided with a negative lead angle whereby the active cutting edge is obliquely related to the cutter insert supporting surface such that the cutting edge will first engage the workpiece at a location spaced from the adjacent insert corner when making interrupted cuts such as occur when the insert is used in a milling tool, shaper or planer, or when turning a workpiece having an interrupted circumference such as a keyway or the like. By initially engaging the active cutting edge with the workpiece at a location remote from the adjacent insert corner when making interrupted cuts the likelihood of damaging an insert corner is substantially reduced.

BRIEF DESCRIPTION OF THE DRAWINGS

The aforementioned objects and advantages of the invention will be appreciated from the following description and accompanying drawings wherein:

FIG. 1 is a plan view of a typical conventional cutter insert and workpiece arrangement in accord with the prior art, FIG. 2 is a perspective view of a prior art cutter insert, FIG. 3 is an enlarged plan detail view of a prior art cutter insert illustrating the chip flow at the corner, FIG. 4 is a top plan view of a workpiece and cutter insert in operative relationship in accord with the invention, FIG. 5 is a perspective view of a cutter insert utilizing the concepts of the invention, FIG. 6 is a top plan view of the insert of FIG. 5, FIG. 7 is a side elevational view of the insert, FIG. 8 is a detail sectional view as taken along Section 8—8 of FIG. 5, and FIG. 9 is a plan view of a cutter insert in accord with the invention, the arrows indicating the flow of the chip material.

DESCRIPTION OF THE PREFERRED EMBODIMENTS

FIGS. 1-3 disclose a conventional prior art multiple sided cutter insert over which the invention is an improvement. In these figures, the cutter insert is being used to machine a rotating workpiece generally indicated at 10 having a large diameter at 12 and the workpiece is being machined by the cutter insert to form a reduced diameter 14. The prior art cutter insert 16, whose configuration is best appreciated from FIG. 2, is of a square configuration having four lateral sides or faces 18 which are disposed at 90° with respect to the adjacent intersecting lateral sides, the intersections being defined by a convex cylindrical segment radius 20. The cutter insert top surface 22 is intersected by the mounting hole 24 for receiving the mounting bolt 26, for attaching the cutter insert upon its holder 28, FIG. 1.

The top surface 22 is recessed by four chip forming recesses 30 each intersecting a side 18 and substantially parallel thereto wherein the intersection of the sides 18 and the associated recess 30 defines a linear cutting edge 32. The depth of the recesses 30 may increase toward the intersection of a recess with a lateral side 18 as represented at 34 in FIG. 2, and as will be readily appreciated from the drawings, the recesses 30 intersect the radiused corners 20.

During machining, the cutter insert 16 is mounted upon the holder 28 as shown in FIG. 1 and the cutter insert is moved to the left to engage a cutting edge 32 with the workpiece machined edge 36 as shown in FIG. 3. Simultaneously, the cutter insert corner 20 will be forming the concave workpiece surface 38 as the insert 16 moves to the left along the length of the workpiece 10. During cutting, as the workpiece material is being rotated into engagement with the insert cutting edge 32 and corner 20, FIG. 3, the workpiece material is being removed in the form of a chip, and the chip material flow is perpendicular to the cutter insert surface removing the workpiece material. Accordingly, the chip material being removed at the workpiece edge 36 will be moving in the direction of the arrows 40, FIG. 3, perpendicular to the cutting edge 32, while the chip material being removed by the corner 20 will be flowing in the direction of the arrows 42 which are in a non-parallel relationship because of the configuration of the corner 20 and the workpiece concave surface 38 being formed by the cutter insert corner 20. As will be readily appreciated from FIG. 3, the chip flow as represented by arrows 40 is angularly related to the chip flow occurring at the corner 20 and surface 38, as represented by arrows 42. The chip material movement as represented by arrows 42 is converging toward the center of the radius of the corner 20, and the chip material flowing into the recess 30 adjacent the corner 20 is being compressed upon itself creating an interference and resistance to turning of the workpiece 10 which significantly adds to the power requirement to produce the cutting action and causes entanglement of the chips, and the friction between the cutter insert and workpiece produces high temperatures and "hot spots" within the cutter insert corner requiring frequent rotation of the cutter insert 16 on holder 28 to provide sequential cutting edges 32 and corners 20 to the workpiece by rotating the cutter insert 90° intervals on the holder 28 after the bolt 26 is unloosened, and retightened.

A cutter insert utilizing the inventive concepts is shown in FIGS. 4-9 of the drawings. In the drawings a five sided regular pentagon version of the invention is illustrated. However, it is to be appreciated that cutter inserts of other configurations are within the scope of the invention, for instance, the cutter insert may be in the form of a regular six sided hexagon. With either embodiment the inventive concepts are identical, and will be appreciated from the description of the illustrated five sided insert.

In FIG. 4 the rotating workpiece is represented at 44 having a large diameter at 46 and a small diameter at 48 separated by the oblique transitional shoulder 50 as being formed by the cutter insert.

The cutter insert 52 is of a generally regular pentagon configuration having five identical lateral sides or faces 54, adjacent sides intersecting at corners 56. As will be appreciated from the drawings the corners 56 are sharp, without a discernible radius, and the advantages of this type of cutter insert corner are later described.

The cutter insert 52 includes a top surface 58 and a substantially parallel bottom surface 60, and a central hole 62 is defined in the insert 52 intersecting the surfaces 58 and 60. The hole 62 receives the mounting bolt 64 whereby the cutter insert 52 may be firmly mounted in the insert receiving recess 66 defined in the holder 68, the bottom surface 60 firmly engaging the recess.

A plurality of chip forming recesses 70 of elongated configuration are formed adjacent each cutter insert side 54. As will be appreciated from FIG. 8, the recesses 70 are of a concave configuration and intersect the adjacent side 54 to define a linear cutting edge 72. The recesses 70 increase in depth into the top surface 58 toward the intersection of the recesses with a lateral surface such as at intersection 74, and as will be readily appreciated from FIGS. 5 and 7, the chip recesses 70 of adjacent lateral sides 54 intersect each other as defined by intersection line 76.

The dimension of the lateral sides 54 as defined by the associated corners 56, and the depth and configuration of the chip recesses 70, is such that the length of the cutting edge 72 defined by an intersecting side 54 and recess 70 is greater than one-half the length of a side 54 as defined by its associated corners 56.

The cutting edges 72 are obliquely disposed to the plane of the top surface 58 and 60 as will be appreciated from FIG. 7, providing a negative lead angle as the edge 72 inclines "downwardly" as it approaches the adjacent corner 56, for a purpose later described.

The manner of use of a cutter insert 52 utilizing the inventive concepts is best appreciated from FIGS. 4 and 9. Upon mounting the insert 52 in the holder recess 66 by means of bolt 64 the cutter insert is brought into engagement with the workpiece 44 and moved to the left, FIG. 4, with respect thereto to bring the cutting edge 72 into engagement with the workpiece, FIG. 9, to define the shoulder 50. As the material of the workpiece 44 is rotated into engagement with the insert cutting edge 72, FIG. 9, the flow of chip material into the recess 70 will be at right angles to the shoulder 50 and the cutting edge 72 as represented by arrows 78 and the chip material of workpiece 44 will be defected upwardly out of the recesses 70 free and clear of the cutter insert area.

As will be appreciated from FIG. 9, all of the arrows 78 are parallel to each other, as compared to the non-parallel relationship of the chip flow arrows 40 and 42 of FIG. 3. The parallel chip flow into the recess 70, FIG. 9, is due to the fact that no radius exists at the corners 56. Accordingly, the material removed at the workpiece 44 at the intersection of the smaller diameter 48 and shoulder 50 by the associated corner 56 will be at right angles to the operative cutting edge 72 and the parallel chip flow into the associated recess 70 eliminates interference of the chip material as it is being removed from the workpiece which substantially reduces the power required to rotate the workpiece during cutting, and permits a relatively uniform temperature to exist across the cutting edge 72 eliminating "hot spots" at the cutting edge resulting in a longer effective life for the operative cutting edge 72 before replacement is required.

Upon the operative cutting edge 72 becoming sufficiently worn as to require the use of a new cutting edge the bolt 64 is loosened, the cutter insert 52 is rotated about the bolt 64 to present a new and sharp cutting edge at 72 for engagement with the workpiece after tightening of bolt 64.

The inclination of the cutting edges 72 to the insert bottom 60, FIG. 7, provides a negative lead angle for the cutting edges which further strengthens the cutting edges and when the cutter insert is used with mills, shapers or planers which intermittently engage the workpiece to produce interrupted cuts, or when turning a workpiece having an interrupted circumference, the negative lead angle of the edges 72 cause the active edge 72 to initially engage the workpiece at a location spaced from the adjacent corner 56. Accordingly, during interrupted cutting action the corners 56 of the active cutting edge is not subjected to the impact and shock occurring during interrupted cutting resulting in increased cutter insert tool life.

Because the cutter insert corners 56 do not have a radius the fact that the included angle 80, FIG. 6, defined by intersecting sides 54 is greater than 90° provides greater support of the corners 56 to resist fracture, than would be provided if the cutter insert was of a four sides or three sides configuration, and preferably, the included angle 80 is between 108°, as is present with a regular pentagon, and 120°, as is present with a regular hexagon. Such a range of obtuse angles permits a cutter insert to be provided of acceptable dimensions having a plurality of sequentially usable lateral sides and cutting edges which provides sufficient support for the sharp corners 56 of the cutter insert.

The configuration of the cutter insert permits an angle A to exist between the workpiece surface 48 and the "rake" edge 72 of 3° to 5° and this angular relationship is preferred.

Resharpening of the cutting edges 72 is accomplished by regrinding of the chip recesses 70, and as the recesses 70 intersect each other at the lines 76 regrinding is simplified and accomplished by conventional grinders, and yet the intersection of adjacent chip recesses 70 does not deleteriously affect the operational advantages of the cutter insert of the invention as described above.

The invention permits rapid removal of metal from a workpiece minimizing energy requirements and frequent need to attend the cutter insert to present new cutting edges. The concepts of the invention may be utilized in cutter inserts employed with turning, milling and shaping machines, and the like, and it is appreciated that various modifications to the inventive concepts may be apparent to those skilled in the art without departing from the spirit and scope of the invention.

What is claimed is:

1. A cutter insert characterized by its ability to support cutting insert apexes to avoid fracture and control chip flow comprising, in combination, a body of hard material having a plurality of lateral sides, a top surface and a bottom surface, adjacent lateral sides intersecting at corner edges to define an included angle substantially between 108° and 120°, an elongated concave chip forming recess defined in said body top surface adjacent to and intersecting each lateral side and lateral side corner edge defining a cutting edge at the intersection with the associated lateral side, said corner edges defined by intersecting lateral sides defining sharp apexes free of radii and said concave recesses at said corner edges defining a chip flow surface at the associated cutting edge substantially perpendicular to the associated cutting edge at the associated corner edge.

2. In a cutter insert as in claim 1, said body lateral sides having ends defined by the associated corner edges defining the length of said lateral sides, said elongated concave chip forming recess intersecting the associated lateral side to define a cutting edge for a distance at least one-half of the length of the associated lateral side.

3. In a cutter insert as in claim 1, said body top and bottom surfaces defining substantially parallel spaced planes, said concave chip forming recesses each having a longitudinal axis, said axes of said recesses being obliquely related to the plane of said body bottom surface whereby said intersection of said recesses with the associated lateral side defines a cutting edge obliquely related to the plane of said bottom surface having a negative lead angle.

4. In a cutter insert as in claim 1, said concave chip forming recesses associated with adjacent body lateral sides intersecting with each other adjacent said body top surface.

5. In a cutter insert as in claim 1, said body having five lateral sides of equal length as defined by said corner edges wherein adjacent intersecting lateral sides define equal included angles, said lateral sides defining a regular pentagon.

6. In a cutter insert as in claim 1, said body having six lateral sides of equal length as defined by said corner edges wherein adjacent intersecting lateral sides define equal included angles, said lateral sides defining a regular hexagon.

* * * * *